Patented Dec. 1, 1936

2,062,676

UNITED STATES PATENT OFFICE 2,062,676

COMPOSITIONS OF MATTER AND PETROLEUM PRODUCTS AND METHOD OF MAKING

Orland M. Reiff, Woodbury, N. J., assignor to Socony-Vacuum Oil Company, Incorporated, New York, N. Y., a corporation of New York No Drawing. Application April 26, 1935, Serial No. 18,390

10 Claims. (Cl. 87—9)

This invention is directed to improved pour point depressants or substances capable of lowering the temperature at which a hydrocarbon oil comprising a substantially homogeneous mixture of liquid oils and waxy solids undergoes loss of fluidity. The invention also contemplates the provision of novel compositions of matter.

Pour point depressants heretofore known comprise certain alkyl-substituted aromatic hydrocarbons and certain alkyl-substituted chlorinated aromatic hydrocarbons. In a copending application, Serial No. 18,341, I have disclosed novel pour point depressants comprising the condensation products of alkyl-substituted oxyaromatic hydrocarbons and chlorinated aliphatic hydrocarbons of relatively high molecular weight, as defined therein. In a copending application, Serial No. 18,342, I have also disclosed that the alkyl-substituted oxyaromatic compounds of my copending application Serial No. 18,341, may be converted into resinous products by condensation with certain resinifying agents.

I have now further discovered that certain of the novel resinous products so formed exhibit extraordinary efficiency as pour point depressants, and the present invention is specifically directed to the provision of such improved pour point depressants and oils containing the same.

This invention has among its principal objects, the provision of improved pour point depressants, and improved products comprising petroleum oils in combination therewith. Other objects and advantages will appear from the more detailed description of my invention set forth hereinafter.

As described in my copending application, Serial No. 18,341 certain condensation products are obtained by subjecting a member of each of two groups of compounds to the Friedel-Crafts synthesis, which employs an aluminum chloride catalyst. The first of said groups of compounds comprises the hydroxyaromatic compounds and corresponding aromatic ethers, these classes being hereinafter designated for convenience as oxyaromatic compounds such as, for example, phenyl, cresol, anisol, resorcinol, hydroxy-diphenyl, hydroquinone, pyrogallol, beta-naphthol and the like. The second group of compounds comprises the chlorinated aliphatic hydrocarbons of relatively high molecular weight, such as chlorinated petroleum naphthas, kerosenes, heavy oils such as gas oils and lubricants, petrolatum, and crystalline waxes, and/or similar hydrocarbons derived from other sources, but more especially the chlorinated paraffin waxes. The product of this condensation reaction is designated for convenience and hereinafter referred to as heavy alkyl-substituted oxyaromatic compounds or simply as alkyl-substituted oxyaromatic compounds.

As one specific example of the method of preparation of these novel condensation products, I may cite the preparation of a condensation product of phenol and paraffin wax.

In this specific illustrative example, I employ as a startinf material a crystalline paraffinic petroleum wax of approximately 130° F., A. S. T. M. melting point. This wax may be chlorinated by melting the wax, holding it at a temperature of approximately 200° F. and bubbling chlorine through it until it has absorbed about 12% of its weight of chlorine, giving a product approximating a monochloroparaffin, hereinafter referred to as monochlorwax. This reaction may be successfully carried out at any temperature above the melting point of the wax, but I prefer a temperature of about 200° F. since the reaction proceeds more slowly at lower temperatures, and at higher temperatures the product may be darkened.

I then prepare a condensation product of this chlorwax with phenol, according to the well known Friedel-Crafts synthesis with aluminum chloride, using as a representative reaction mixture the specified ingredients in the following proportions:

*Example Ib*

| | Parts by weight |
|---|---|
| Monochlorwax | 200 |
| Phenol | 12.5 |
| Aluminum chloride | 4 to 16 |

In the Friedel-Crafts reaction, the chlorwax and oxyaromatic compound are mixed together at a temperature slightly above the melting point of the wax, (in the present instance, under 150° F.), thereafter adding the aluminum chloride catalyst slowly in order to avoid excessive foaming due to evolution of hydrochloric acid gas. For less soluble oxyaromatic compounds such as hydroquinone and pyrogallol, it is desirable to use a solvent, for example ethylene dichloride, at appropriate temperature and concentration of aluminum chloride, in order to carry out the reaction suitably.

The reaction rate is controlled by regulating the temperature. Using 2% aluminum chloride in respect to chlorwax, some reaction takes place around 140° F., but a steady rapid evolution of HCl gas is obtained around 200° F. The reaction may be carried out suitably by heating the reaction mixture for several hours at 200° F., then gradually raising the temperature during a two hour period, to 300° F. to complete the reaction. As the reaction proceeds, the mixture becomes more viscous, but by gradually raising the temperature, the viscosity of the mixture is sufficiently reduced so that diluents are unnecessary to give proper mixing.

Approximately the same proportion of aluminum chloride catalyst may be used in the preparation of the various other alkyl substituted oxyaromatic compounds mentioned above. Further, an oxyaromatic compound may be substituted with alkyl radicals using different concentrations of aluminum chloride and a wide range of temperatures. In the preparation of wax-substituted phenol, for instance, a product has been prepared using 2% to 8% of aluminum chloride and a maximum temperature of 212°–300° F. By use of the higher reaction temperature (300° F.), the reaction may be carried out with the lower concentration of $AlCl_3$ (2%). With 8% $AlCl_3$, on the other hand, the reaction may be completed at the lower temperature (212° F.).

To purify the paraffin-wax-substituted oxyaromatic compound, the reaction mixture is run into water with stirring, and thoroughly water-washed to remove aluminum chloride. To facilitate removal of aluminum chloride, a diluent may be added, such as light petroleum distillate of the type of kerosene. The diluent and unreacted chlorwax or wax are then removed by vacuum distillation, the high molecular weight substitution product remaining behind as a viscous, oily material. By vacuum distillation at high temperature (350° C.), all but a trace of chlorine may be removed from the product. However, for the uses of the alkyl-substituted oxyaromatic compounds described herein, the products are suitable for use whether or not they are purified by separating them from the chlorwax or wax.

Similar alkyl-substituted oxyaromatic compounds may be prepared by using different relative concentrations of reagents or ingredients in the reaction mixture. Also, other oxyaromatic compounds may be substituted for the phenol, representative reaction mixtures in a number of additional illustrative examples being given below:

*Example Ia*

| | Parts |
|---|---|
| Monochlorwax | 200 |
| Phenol | 20.8 |
| Aluminum chloride | 8 |

*Example IIa*

| | Parts |
|---|---|
| Monochlorwax | 200 |
| Anisol | 24 |
| $AlCl_3$ | 8 |

*Example IIb*

| | Parts |
|---|---|
| Monochlorwax | 200 |
| Anisol | 14.4 |
| $AlCl_3$ | 8 |

*Example IIIa*

| | Parts |
|---|---|
| Monochlorwax | 150 |
| Cresol | 54 |
| $AlCl_3$ | 8 |

*Example IIIb*

| | Parts |
|---|---|
| Monochlorwax | 150 |
| Cresol | 18 |
| $AlCl_3$ | 6.7 |

*Example IVa*

| | Parts |
|---|---|
| Monochlorwax | 100 |
| P-hydroxydiphenyl | 14 |
| $AlCl_3$ | 4 |

*Example IVb*

| | Parts |
|---|---|
| Monochlorwax | 100 |
| P-hydroxydiphenyl | 7 |
| $AlCl_3$ | 4 |

*Example Va*

| | Parts |
|---|---|
| Monochlorwax | 100 |
| Beta-naphthol | 16 |
| $AlCl_3$ | 8 |

*Example Vb*

| | Parts |
|---|---|
| Monochlorwax | 100 |
| Beta-naphthol | 9.6 |
| $AlCl_3$ | 8 |

*Example VIa*

| | Parts |
|---|---|
| Monochlorwax | 120 |
| Resorcinol | 11 |
| $AlCl_3$ | 5 |

The alkyl-substituted oxyaromatic compounds referred to above may be prepared from mixtures of oxyaromatic compounds and chlorinated aliphatic hydrocarbons containing as little as 35 grams, or slightly more, of chlorine per gram molecular weight of oxyaromatic compound, corresponding approximately to a mono-substituted oxyaromatic compound. The alkyl-substituted oxyaromatic compounds which produce the most effective pour point depressors, made in accordance with this invention, are prepared from reaction mixtures containing a proportion of chlorinated aliphatic hydrocarbons corresponding to about 105 grams, or slightly more, of chlorine, per gram molecular weight of the oxyaromatic compound, corresponding approximately to a tri-substituted oxyaromatic compound. In general, a higher proportion of chlorinated aliphatic hydrocarbon results in the formation of less effective pour point depressors. However, for use in the preparation of pour point depressors for oils which are subjected to relatively high temperatures in use, as for example motor oils, alkyl-substituted oxyaromatic compounds which are more nearly saturated than tri-substituted compounds have the advantage of producing pour point depressors of greater stability; e. g., a pour point depressor made in accordance with this invention from a compound corresponding approximately to a tetra-substituted oxyaromatic compound is a pour point depressor of good combined effectiveness and stability for engine use. Also, they may be prepared from mixtures containing a greater proportion of chlorine, up to a proportion sufficient to saturate the oxyaromatic compound.

While I prefer, in the practice of my invention to employ a chlorwax, or other chlorinated aliphatic hydrocarbon as defined above, containing about 12% chlorine, and corresponding approximately to monochlorwax as specified in the above examples, I may employ other chlorwax containing other proportions of chlorine to the wax, or other aliphatic hydrocarbons, without departing from my invention. Thus I may employ, with good results, a chlorinated wax or other chlorinated aliphatic hydrocarbon containing as little as 9% and as much as about 18% of chlorine to the wax or other aliphatic hydrocarbon. If excessively large proportions of chlorine are employed, there is a tendency to reduce the amount of desired aliphatic substituents of relatively high molecular weight and to produce undesirable side reactions.

As discussed in my copending application Serial No. 18,341, these alkyl-substituted oxyaromatic compounds may be further subjected to a condensation or resinifying reaction with resinifying reagents such as hexamethylenetetramine, butyraldehyde, and glycerol, or other resinifying reagents capable of entering into a resinification reaction with the parent oxyaromatic hydrocarbon.

Hexamethylenetetramine is well known as an active resinifying agent, reacting with phenol for instance, to give resins which are readily convertible, by heating, into insoluble, infusible compositions. Butyraldehyde, on the other hand, is much less reactive toward phenol and does not form insoluble, infusible resin compositions in this way, but will effect resinification to form softer more plastic resins and is satisfactory for many uses of this invention. Glycerol is much less reactive in this respect than hexamethylenetetramine, but will react with phenol to form a useful resin capable of conversion into insoluble, infusible form upon heating strongly. The various oxyaromatic compounds vary in their reactivity towards various resinifying agents, nevertheless they do possess the same general properties, in this respect, as phenol to a substantial, and in some instances, to a high degree. From the foregoing it will be seen that by proper selection of the resinifying agent the properties of the resinified products can be varied and controlled to a certain extent to adapt the product to desired uses. Many resinifying agents are known which will resinify the oxyaromatic compounds, the above named specific examples being illustrative; also such agents as aldehydes (e. g., formaldehyde), ketones, monohydric alcohols, sulfur compounds; etc.

It is this class of resinifying agents which will resinify the parent oxyaromatic compounds that is contemplated by this invention in its broadest aspect to produce the novel products of this invention by resinification of the alkyl-substituted oxyaromatic compounds defined herein.

While the oxyaromatic compounds in general are made less reactive toward resinifying agents by the introduction of alkyl radicals, nevertheless I have found that these alkyl-substituted oxyaromatic compounds of my invention will react with the general class of resinifying reagents with which the parent non-substituted, oxyaromatic compounds are capable of reacting.

I have also found that the types of resinous materials which may be produced from heavy alkyl-substituted oxyaromatic compounds are dependent upon certain factors. One of the important factors is the degree or extent of substitution of the alkyl radical in the aromatic nucleus, as determined by the proportion of alkyl chloride to oxyaromatic compound. Another important factor is the molecular weight of the aliphatic hydrocarbon corresponding to the substituted alkyl radical.

The degree or extent of substitution of alkyl radical may be effectively employed in my invention to control the type of resinous material desired. One mol. of phenol, for instance, is capable theoretically of reacting with 1 to 5 mols of a monochloroparaffin. When the substitution is carried out with approximately 1 mol. of monochloroparaffin, a more reactive alkyl-substituted phenol is obtained, which is capable of producing harder, but less oil-soluble resins with resinifying agents, than when the phenol molecule is more highly substituted with alkyl radicals. When sufficient alkyl chloride is used in the Friedel-Crafts synthesis to fully saturate the phenol molecule, the substituted product cannot be hardened by the usual methods, but remains as an oil-soluble, soft, resinous composition.

Changes in the molecular weight of the substituted alkyl can be utilized in accordance with my invention to control the nature and properties of the resulting resinous materials. When phenol, for instance, is reacted with monochlorwax to give a mono-wax-substituted phenol, the product may be converted into a rubber-like, flexible resin by reacting it with hexamethylenetetramine. On the other hand, when phenol is similarly substituted with paraffinic materials of lower molecular weight, such as characterize kerosene, the product may be changed into a hard resin by condensing it with hexamethylenetetramine. Hence, the degree of hardness of phenol resins may be controlled by means of my invention by substituting alkyl radicals, of the proper molecular weight, into the phenol molecule.

As one example of the method of forming resinous materials with which this invention is concerned, I shall now describe the procedure involving the use of hexamethylenetetramine. In this operation, the alkyl-substituted oxyaromatic compound is condensed with hexamethylenetetramine by heating a mixture of the two substances under the pressure developed in the reaction at a temperature of about 300° F., for a period of from 2 to 8 hours or longer, depending upon the activity of the particular alkyl-substituted compound employed. The temperature may be varied with corresponding changes in the rapidity of reaction; also the pressure similarly may be varied. This resinification may even be carried out in open vessels at atmospheric pressure, by adding hexamethylenetetramine at intervals with stirring.

As other examples of my invention, butyraldehyde and glycerol may be condensed with an alkyl-substituted oxyaromatic compound in presence of a suitable acid catalyst. In each instance a mixture of the reactants are heated together, with stirring, at a temperature of say 300° F. in the presence of about 2% concentrated acid, using $H_2SO_4$ for the glycerol condensation and HCl for the butyraldehyde condensation reaction. The heating is continued until a test sample of the product shows the desired degree of hardness upon cooling.

These novel resinous materials herein disclosed possess a wide range of properties varying from light resinous materials, soluble in petroleum oils, and not convertible by heating into forms which are insoluble in petroleum oils; through resins capable of being converted into insoluble infusible forms by strong heating; to resins which are readily heat-convertible into insoluble, infusible compositions such as are commonly utilized for the production of molded products and the like.

It is understood that the term "hydrocarbons of relatively high molecular weights," as used in the claims, shall mean any of the petroleum fractions or similar hydrocarbons as defined in this specification, or any mixtures thereof, or any single hydrocarbon of molecular weight falling within the characterizing range defined herein, or any mixtures thereof, and the characterizing range defined herein shall be limited to those hydrocarbons of molecular weights at least as high as those corresponding to heavy lubricant oils, petrolatum and wax.

I have discovered that of the novel resinous products referred to above, the resinous products of the type which are soluble in relatively heavy petroleum oils and which resist conversion into infusible, insoluble forms by heating to moderate temperatures, are especially useful in depressing the pour point of petroleum hydrocarbon oils containing waxy materials. They exhibit extraordinary effectiveness in depressing pour point.

It is highly desirable that pour point depressors be very oil soluble, and non-convertible into insoluble compositions upon heating, as for instance in the crankcase of an automotive engine. I have found that by using reaction mixtures containing a proportion of chlorwax, or other chlorinated aliphatic hydrocarbons, corresponding approximately to 100 grams chlorine or more, per mol. of oxyaromatic compound, alkyl-substituted oxyaromatic compounds are formed which show little tendency to become converted into solid or semi-solid insoluble resins when condensed with resinifying agents, for example hexamethylenetetramine and glycerol, but rather remain fluid or viscous and oil soluble, and I have found that they are effective pour point depressors and are more effective than the parent wax-substituted oxyaromatic compound. On the other hand, I have found that the resinous condensation products obtained by condensing the alkyl or wax-substituted oxyaromatic compound with butyraldehyde, for example, do not change to insoluble compositions upon heating, and that butyraldehyde may be condensed with alkyl-substituted oxyaromatic compounds containing less of the alkyl substituent than that specified above to form improved, oil-soluble pour point depressors.

Examples of the improved pour point depressants and of their combinations with petroleum lubricant oil are given in Tables 1 to 6 below. In each example, the product resulting from the first named step designated (a) is the alkyl-substituted oxyaromatic compound described above, namely, the starting material of the method of the present invention. In each example, the product resulting from the steps designated b, c, d, etc. are the products produced by the resinification or condensation with resinifying agents as described above. The greater effectiveness of the pour point depressants resulting from these subsequent steps is set forth in these examples and constitutes one of the principal advantages of the present invention. In all cases the oil with which these reagents is mixed is the same, namely a refined, undewaxed hydrocarbon mineral lubricant oil having a viscosity of 249 seconds Saybolt universal at 130° F. and an A. S. T. M. pour test of +20° F.

TABLE 1

*Resinified paraffin wax-substituted phenol as pour point depressor*

(a) 100 grams chlorwax is condensed with 10.4 grams phenol to form the wax-substituted phenol.
(b) Product of (a) is condensed with hexamethylenetetramine.
(c) Product of (a) is condensed with butyraldehyde.
(d) Product of (a) is condensed with glycerol.

*Effectiveness as pour point depressors*

| Blending with oil of Saybolt viscosity of 249 sec. at 130° F. | Concentration of depressor in oil | A. S. T. M. pour test |
|---|---|---|
| | Percent | ° F. |
| Without depressor | 0 | +20 |
| With depressor (a) | 1/16 | +5 |
| With depressor (b) | 1/16 | −15 |
| With depressor (c) | 1/16 | −5 |
| With depressor (d) | 1/16 | 0 |

TABLE 2

*Resinified paraffin wax-substituted anisol as pour point depressor*

(a) 200 grams of chlorwax is condensed with 24 grams anisol to form wax-substituted anisol.
(b) Product of (a) is condensed with hexamethylenetetramine.
(c) Product of (a) is condensed with butyraldehyde.
(d) Product of (a) is condensed with glycerol.

*Effectiveness as pour point depressors*

| Blending with oil of Saybolt viscosity of 249 sec. at 130° F. | Concentration of depressor in oil | A. S. T. M. pour test |
|---|---|---|
| | Percent | ° F. |
| Without depressor | 0 | +20 |
| With depressor (a) | 1/4 | +5 |
| With depressor (b) | 1/4 | −25 |
| With depressor (c) | 1/4 | −10 |
| With depressor (d) | 1/4 | −15 |

TABLE 3

*Resinified paraffin wax-substituted p-hydroxydiphenyl as pour point depressor*

(a) 100 grams of chlorwax is condensed with 14 grams p-hydroxydiphenyl to form wax-substituted compound.
(b) Product of (a) is condensed with hexamethylenetetramine.
(c) Product of (a) is condensed with butyraldehyde.
(d) Product of (a) is condensed with glycerol.

*Effectiveness as pour point depressors*

| Blending with oil of Saybolt viscosity of 249 sec. at 130° F. | Concentration of depressor in oil | A. S. T. M. pour test |
|---|---|---|
| | Percent | ° F. |
| Without depressor | 0 | +20 |
| With depressor (a) | 1/8 | +5 |
| With depressor (b) | 1/8 | −10 |
| With depressor (c) | 1/8 | 0 |
| With depressor (d) | 1/8 | −5 |

TABLE 4

Resinified paraffin wax-substituted beta-naphthol as pour point depressor (a) 100 grams chlorwax is condensed with 16 grams beta-naphthol to form wax-substituted product.
(b) Product of (a) is condensed with hexamethylenetetramine.
(c) Product of (a) is condensed with butyraldehyde.
(d) Product of (a) is condensed with glycerol.

Effectiveness as pour point depressors

| Blending with oil of Saybolt viscosity of 249 sec. at 130° F. | Concentration of depressor in oil | A. S. T. M. pour test |
|---|---|---|
| | Percent | ° F. |
| Without depressor | 0 | +20 |
| With depressor (a) | 1/8 | +10 |
| With depressor (b) | 1/8 | 0 |
| With depressor (c) | 1/8 | +10 |
| With depressor (d) | 1/8 | −20 |

TABLE 5

Resinified paraffin wax-substituted resorcinol as pour point depressor (a) 120 grams chlorwax is condensed with 11 grams resorcinol to form a wax-substituted product.
(b) Product of (a) is condensed with hexamethylenetetramine.
(c) Product of (a) is condensed with butyraldehyde.
(d) Product of (a) is condensed with glycerol.

Effectiveness as pour point depressors

| Blending with oil of Saybolt viscosity of 249 sec. at 130° F. | Concentration of depressor in oil | A. S. T. M. pour test |
|---|---|---|
| | Percent | ° F. |
| Without depressor | 0 | +20 |
| With depressor (a) | 1/2 | +5 |
| With depressor (b) | 1/2 | −15 |
| With depressor (c) | 1/2 | 0 |
| With depressor (d) | 1/2 | −15 |

TABLE 6

Resinified paraffin wax-substituted cresol as pour point depressor (a) 150 grams chlorwax is condensed with 18 grams cresol to form wax-substituted product.
(b) Product of (a) is condensed with hexamethylenetetramine.
(c) Product of (a) is condensed with butyraldehyde.
(d) Product of (a) is condensed with glycerol.

Effectiveness as pour point depressors

| Blending with oil of Saybolt viscosity of 249 sec. at 130° F. | Concentration of depressor in oil | A. S. T. M. pour test |
|---|---|---|
| | Percent | ° F. |
| Without depressor | 0 | +20 |
| With depressor (a) | 1.0 | +10 |
| With depressor (b) | 1.0 | −25 |
| With depressor (c) | 1.0 | −20 |
| With depressor (d) | 1.0 | −25 |

The usual efficiency or effectiveness of these novel resinified compounds as pour point depressants over the simpler condensation products is apparent from the examples above given. The superiority of these novel resinified compounds over commercially available materials widely used for the same purpose is shown in the following table, which sets forth comparisons of several of the depressants of this invention with a known depressant which is a condensation product of chlorwax and an aromatic hydrocarbon. In these tests, the same oil was used as in the preceding examples. The novel depressant of the present invention used is denoted by numerals which refer to the above examples.

Comparison A

| Known depressant | | Material of Example Ib | |
|---|---|---|---|
| Concentration | Pour | Concentration | Pour |
| % | ° F. | % | ° F. |
| 1 | −20 | 1/10 | −15 |
| 0.5 | −5 | | |

Comparison B

| Known depressant | | Material of Example IIb | |
|---|---|---|---|
| Concentration | Pour | Concentration | Pour |
| % | ° F. | % | ° F. |
| 1 | −20 | 1/4 | −25 |
| 0.5 | −5 | | |

Comparison C

| Known depressant | | Material of Example IVb | |
|---|---|---|---|
| Concentration | Pour | Concentration | Pour |
| % | ° F. | % | ° F. |
| 1 | −20 | 1/8 | −20 |
| 0.5 | −5 | | |

I claim:
1. As a new composition of matter a hydrocarbon oil composition of low pour point comprising a hydrocarbon oil of normally higher pour point, and in combination therewith a small proportion, sufficient to substantially reduce the pour point, of a resinous condensation product comprising the reaction product of oxyaromatic hydrocarbon material selected from the group of compounds consisting of hydroxy aromatic compounds and aromatic ethers, condensed with halogenated aliphatic hydrocarbon material of relatively high molecular weight in the presence of a catalyst, and subsequently condensed with a resinifying agent capable of resinifying the oxyaromatic material.

2. As a new composition of matter a hydrocarbon oil composition of low pour point comprising a hydrocarbon oil of normally higher pour point, and in combination therewith a small proportion, sufficient to substantially reduce the pour point but not in excess of 1%, of a resinous condensation product comprising the reaction product of oxyaromatic hydrocarbon material selected from the group of compounds consisting of hydroxy aromatic compounds and aromatic ethers, condensed with chlorinated paraffin wax in the presence of a catalyst, and subsequently condensed with a resinifying agent capable of resinifying the oxyaromatic material.

3. As a new composition of matter a hydrocarbon oil composition of low pour point comprising a hydrocarbon oil of normally higher pour point, and in combination therewith a small proportion, sufficient to substantially reduce the pour point, of a resinous condensation product comprising the reaction product of oxyaromatic hydrocarbon material selected from the group of compounds consisting of phenol or naphthol, condensed with chlorinated aliphatic hydrocarbon of relatively high molecular weight in the presence of a catalyst of the nature of aluminum chloride, and subsequently condensed with a resinifying agent capable of resinifying said oxyaromatic material.

4. As a new composition of matter a hydrocarbon oil composition of low pour point comprising a hydrocarbon oil of normally higher pour point, and in combination therewith a small proportion, sufficient to substantially reduce the pour point, of a resinous condensation product comprising the reaction product of oxyaromatic hydrocarbon material selected from the group of compounds consisting of hydroxy aromatic compounds and aromatic ethers, condensed with halogenated aliphatic hydrocarbon material of relatively high molecular weight in the presence of a catalyst, and subsequently condensed with a resinifying agent capable of resinifying the oxyaromatic material, the proportion of chlorinated aliphatic hydrocarbon being not substantially less than that corresponding to the mono-substituted oxyaromatic material and not substantially greater than that corresponding to complete saturation of the oxyaromatic material.

5. As a new composition of matter a hydrocarbon oil composition of low pour point comprising a hydrocarbon oil of normally higher pour point, and in combination therewith a small proportion, sufficient to substantially reduce the pour point, of a resinous condensation product comprising the reaction product of oxyaromatic hydrocarbon material selected from the group of compounds consisting of hydroxy aromatic compounds and aromatic ethers, condensed with halogenated aliphatic hydrocarbon material of relatively high molecular weight in the presence of a catalyst and subsequently condensed with a resinifying agent capable of resinifying the oxyaromatic material and selected from the class consisting of aldehydes, ketones, alcohols, sulphur compounds and hexamethylenetetramine.

6. As a new composition of matter a hydrocarbon oil composition of low pour point comprising a hydrocarbon oil of normally higher pour point, and in combination therewith a small proportion, sufficient to substantially reduce the pour point, of a resinous condensation product comprising the reaction product of oxyaromatic hydrocarbon material selected from the group of compounds consisting of hydroxy aromatic compounds and aromatic ethers, condensed with halogenated aliphatic hydrocarbon material of relatively high molecular weight in the presence of a catalyst, and subsequently condensed with a resinifying agent capable of resinifying the oxyaromatic material and selected from the group consisting of hexamethylenetetramine, butyraldehyde, and glycerol.

7. As a new composition of matter a hydrocarbon oil composition of low pour point comprising a hydrocarbon oil of normally higher pour point, and in combination therewith a small proportion, sufficient to substantially reduce the pour point but not in excess of 1%, of a resinous condensation product comprising the reaction product of oxyaromatic hydrocarbon material selected from the group of compounds consisting of hydroxy aromatic compounds and aromatic ethers, condensed with chlorinated paraffin wax in the presence of a catalyst, and subsequently condensed with a resinifying agent capable of resinifying the oxyaromatic material and selected from the group consisting of hexamethylenetetramine, butyraldehyde and glycerol.

8. As a new composition of matter, a lubricant oil composition of low pour point comprising a lubricant oil of normally high pour point, and in combination therewith a small proportion, sufficient to substantially reduce the pour point, of a wax substituted phenol, resinified by the action of hexamethylenetetramine.

9. As a new composition of matter, a lubricant oil composition of low pour point comprising a lubricant oil of normally high pour point, and in combination therewith a small proportion, sufficient to substantially reduce the pour point, of a wax substituted anisole, resinified by the action of hexamethylenetetramine.

10. As a new composition of matter, a lubricant oil composition of low pour point comprising a lubricant oil of normally high pour point, and in combination therewith a small proportion, sufficient to substantially reduce the pour point, of a wax substituted naphthol, resinified by the action of hexamethylenetetramine.

ORLAND M. REIFF.